FIG. I.

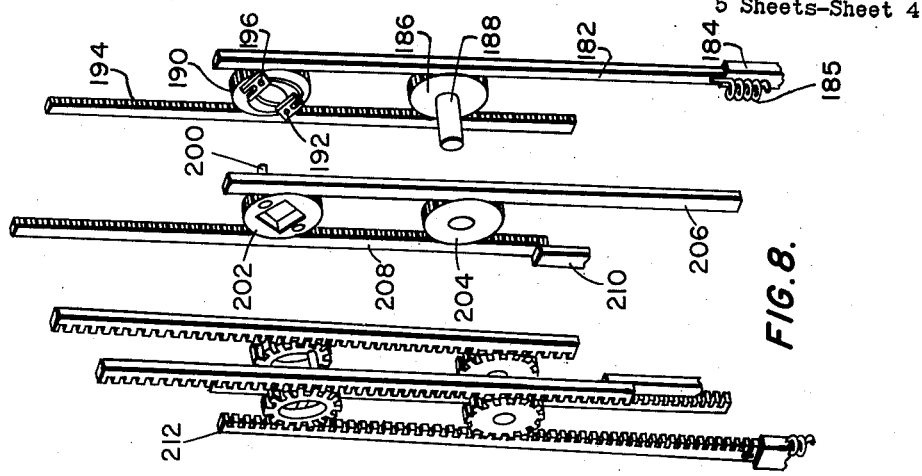
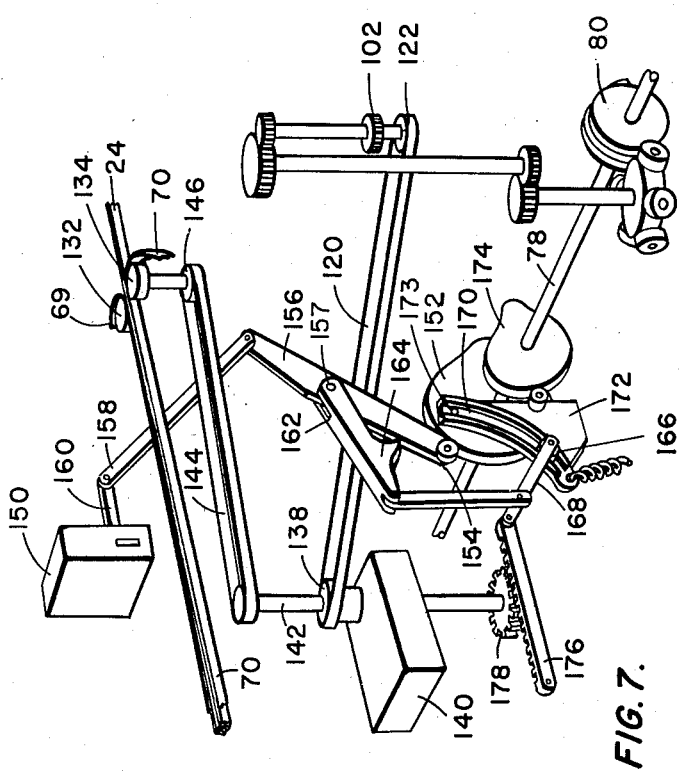

United States Patent Office 2,986,076
Patented May 30, 1961

2,986,076

CONTAINER FORMING APPARATUS AND METHOD

Thomas Flint, Concord, and Robert J. Robinson, Lexington, Mass., assignors to W. R. Grace & Co., Cambridge, Mass., a corporation of Connecticut Filed Jan. 23, 1958, Ser. No. 710,672

20 Claims. (Cl. 93—1)

The present invention relates to the manufacture of containers open at one end and sealed at the other from continuous lengths of flexible and stretchable tubing. The invention is more particularly concerned with a method and apparatus of this character wherein the tubing contains blocks of printing at spaced intervals therealong and wherein the seal is made by application of a clip to the twisted end of the tubing, followed by severing from the tubing of a length including the sealing clip and a block of printing.

The sealing of foodstuffs in impermeable, flexible and preferably transparent containers from which the air has been exhausted has come into extensive use. Such containers are economically made from continuous lengths of tubing, but the nature of the material, including its stretchability, has been an obstacle to efficient high speed manufacture from the material in such form. A part at least of the label for the goods to be packaged in the container desirably is preprinted on the tubing at spaced intervals; obtaining proper registry of such blocks of printing on the completed containers presents a difficult problem. Where such containers have been made by hand-operated machines, the cut end of the tubing has not been satisfactory for the open end of the container because of the irregular, jagged nature of the cut edge which is too weak for the customers' purposes. The operators applying the clips require a length of several inches on both sides of the clip for handling purposes and this introduces a waste of several inches of tubing for each container. Previous methods of manufacture produced many containers which had leaks through the clip-sealed end, resulting in high inspection costs and high reject rates. Hand operated machines are inherently slow in operation, leading to high labor cost.

An object of the invention is to provide an efficient machine and method for making in a continuous operation a series of containers open at one end and sealed at the other end from lengths of flexible and stretchable tubing.

Another object is to provide such a method and machine wherein blocks of printing on the tubing are properly registered on the finished containers.

Another object is to provide such a machine and apparatus wherein the end of the tubing is prepared for sealing by application of the clip by being first regularly pleated and then twisted.

A further object of the invention is to provide such a machine which is substantially automatic in operation, provides proper registry of blocks of printing on the completed containers and provides clip-sealed ends which are tightly sealed.

A further object is to provide such a machine and method wherein the cut, open end of the container is provided by a cut edge which is a smooth curve and which, therefore, has substantial strength.

Further objects are to provide such a method and apparatus wherein waste allowance for sealing of the tubing is substantially eliminated and wherein the cost of inspection and the reject rate is very low.

Another object of the invention is to provide such a machine and method wherein the seals are dependably and reliably formed.

A further object is to provide such a machine and method wherein the tubing is taken from a supply at a uniform rate and under uniform tension.

A further object is to provide a method and apparatus for feeding strip material having a series of spaced markings thereon to a work station step-by-step with each marking accurately registered at the work station during a dwell of the material.

Other and further objects and features of the invention will be apparent from the following specification in which reference is made to the accompanying drawings, wherein:

Fig. 7 is a perspective diagrammatic view of the tubing feed mechanism;

Fig. 8 is a diagrammatic perspective view of the mechanism for twisting the tubing;

Figure 1:
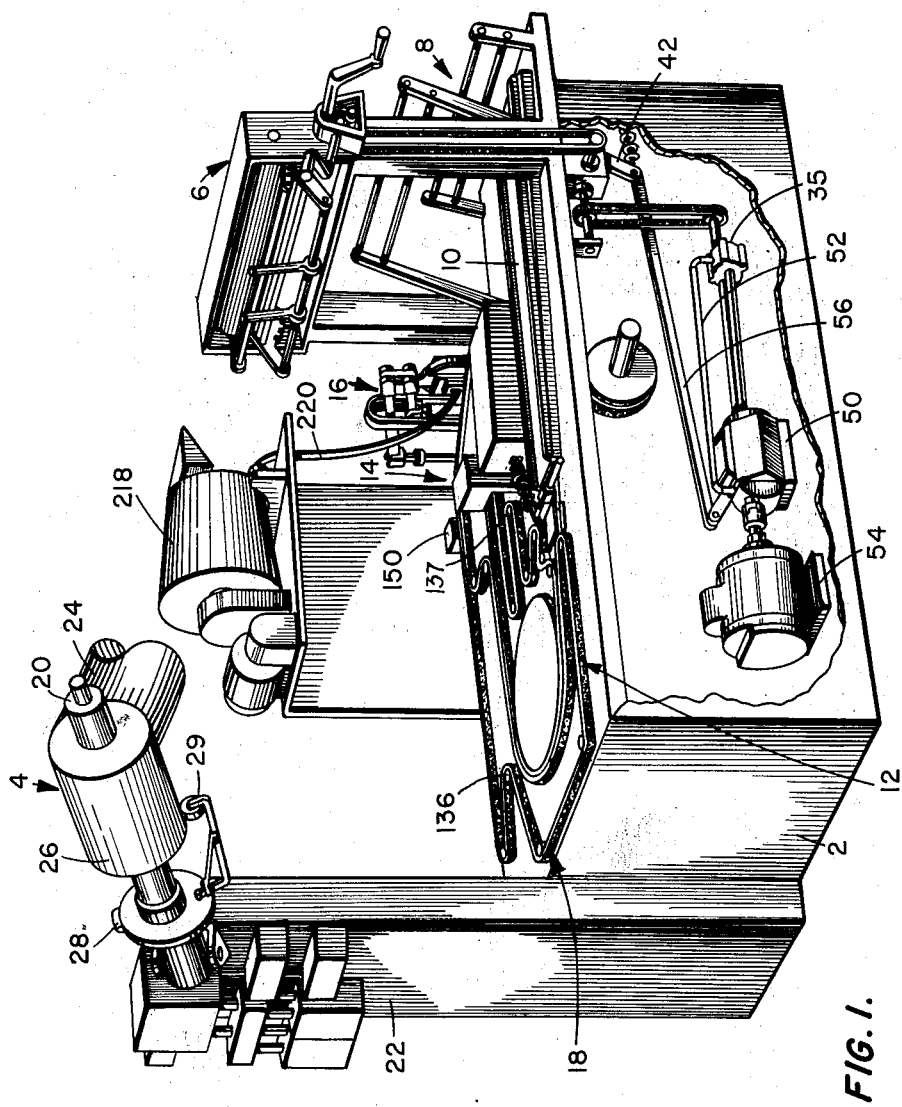
Fig. 1 is a perspective view partly broken away of a presently preferred embodiment of a machine of the invention whereon our method may be practiced.

In accordance with the invention the flexible tubing from which the containers open at one end and sealed at the other are to be formed is fed step-by-step into a work station at which the sealed container is completed. The tubing is initially taken from a supply at a substantially uniform rate and under uniform tension, pleated while traveling at said uniform rate and tension, and after pleating maintained taut and under the uniform tension in its advance from the pleating operation to the work station. At the work station a length of the pleated tubing is twisted, a sealing clip is applied over a part of the twisted portion, the remainder of the twisted portion is untwisted preparatory to cutting and the tubing is then cut off close to the leading side of the clip. The feed mechanism at each step feeds up the proper length of tubing to provide a container of the desired length, with a block of printing, if present, properly registered thereon.

Referring to the drawings, in general organization the embodiment of the machine selected for purposes of illustration of the invention comprises a main frame 2 on and under which the various mechanisms are carried. At one end of the frame is a tubing supply, indicated generally at 4, from which the tubing is drawn by draw-off rolls at 6. From the draw-off rolls, the tubing passes through a tension regulating control at 8. The foregoing parts we refer to as the tubing let-off mechanism. From the let-off mechanism, the tubing passes through the pleater at 10. From the pleater the tubing, gripped between a pair of endless traveling belts at 12, is drawn, with and between the belts, by the feeding mechanism, indicated generally at 14, and is fed step-by-step into the work station at 16 at which it is twisted, sealed and cut off. As the tubing advances from the pleater to the work station it passes through the tubing differential, indicated generally at 18, which maintains the belts and tubing taut and converts the step-by-step travel of the tubing at the feed mechanism into uniform travel of the tubing at the pleater, without disturbing the uniform tension set up in the tubing at the tension control 8.

The tubing supply at 4 comprises a spindle 20 supported for rotation on the upright 22 carried by the main frame 2. A long length of the tubing 24 from which the containers are to be formed is carried on the spindle 20 in the form of a roll 26 of flattened tubing. The tubing, as indicated, is fed from the roll 26 by being drawn therefrom by the draw-off rolls at 6 and rotation of the roll 26 is opposed by a slight braking action applied to the roll by a brake 28. The retarding effect of the brake is continuously adjusted under the control of a feeler 29 which rides on the circumferential surface of the roll 26. As the roll 26 decreases in diameter the feeler 29 moves closer to the axis of the spindle 20 and, through appropriate connections to the brake 28, decreases the retarding effect of the brake to compensate for the decreased moment arm and thus provides that the tubing is drawn from the roll against substantially constant resistance.

Figure 2:
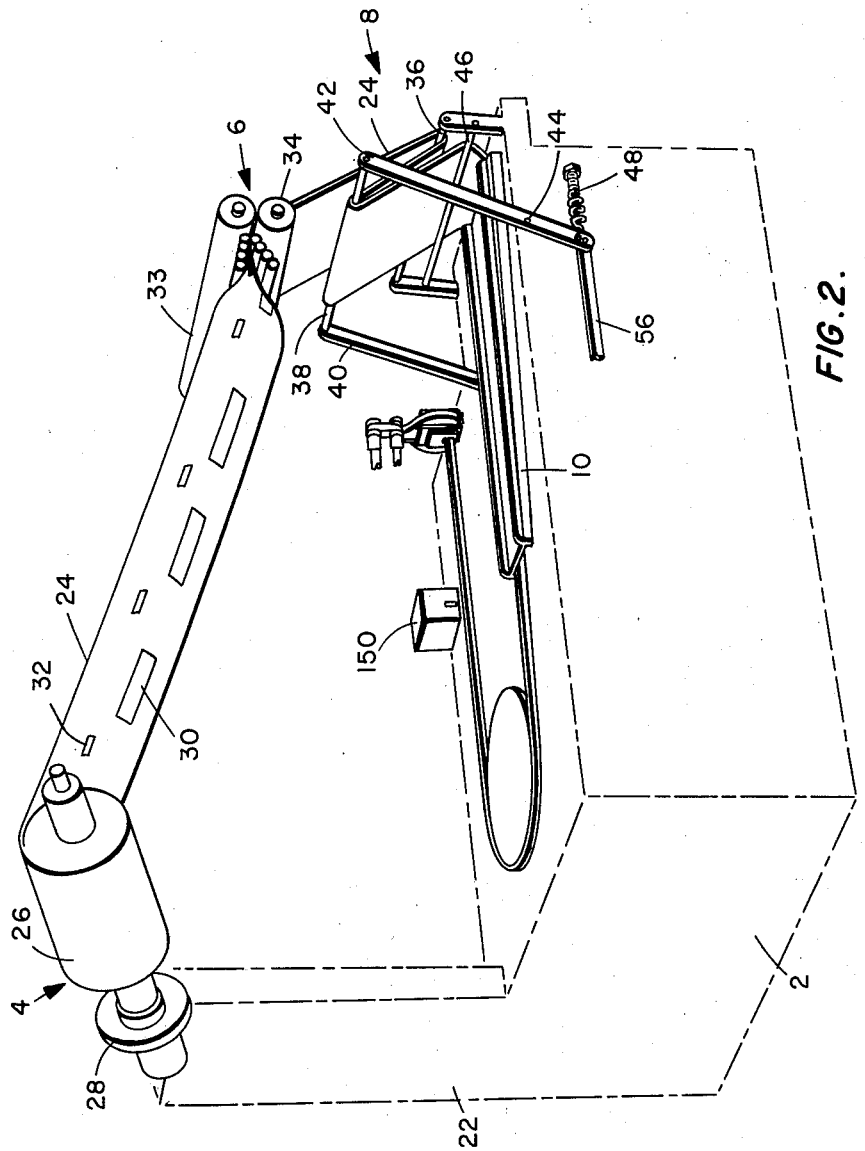
Fig. 2 is a perspective view, similar to Fig. 1, but with parts omitted, showing in more detail the tubing supply let-off mechanism.

The tubing between roll 26 and the draw-off roll assembly 6 is inflated, as appears in Fig. 2, with a bubble of air, which may serve to facilitate inspection of the tubing by an operator if desired or to permit detection of pinholes or other flaws in the tubing.

The tubing 24 may be provided with spaced blocks of printing 30, such as may be desired to form a label or part thereof for the completed container. For the purpose of accurately registering each block of printing at the sealing station with the point at which the tubing will be sealed, we may provide, as a part of the printing, black dots 32 between the blocks of printing to serve as "eye spots" for a photo-electric registering device which forms part of the feed mechanism hereinafter to be described in detail. The eye spots 32 are spaced apart a distance equal to the desired length of the containers. It will be appreciated that in some cases the printed label itself, or some portion thereof, may serve the same purpose as the eye spots.

The draw-off assembly 6 comprises a pair of rolls 33, 34. As the tubing is gripped in the nip of the rolls it is drawn from the roll 26 and at the same time effectively deflated so that the air in the length between roll 26 and rolls 33, 34 is a trapped stationary bubble and need not be replenished during the run of a roll of tubing. The rolls 33, 34 are driven, Fig. 1, through suitable connections by a hydraulic motor 35. The tubing 24 is taken away from the draw-off rolls under constant tension by the tension control at 8 next to be described.

From the draw-off rolls 33, 34 the traveling tubing 24 passes downwardly about a stationary guide roller 36 and thence upwardly and about a dancer roll 38. The dancer roll is carried for free rotation on arms 40 and 42, each pivoted, as at 44, on the machine frame 2. From the dancer roll the tubing passes downwardly, around guide roller 46 adjacent the guide roller 36 and thence into the pleater 10.

The dancer roll 38 is biased to move in a direction away from the guide rollers, 36, 46 by a tension spring 48 connected at one end to the arm 42 below its pivot 44 and adjustably anchored at its other end to the machine frame 2. A similar spring, not shown, likewise acts on the arm 40.

The hydraulic motor 35 which drives the draw-off rolls 33, 34 is driven through a variable-delivery hydraulic pump 50 through suitable piping 52. The pump 50, in turn, is driven from the electric motor 54. The rate of delivery of hydraulic fluid from the hydraulic pump 50 is varied in accordance with the position of the dancer roll 38 through a mechanical linkage 56 leading from the lower end of arm 42 to the pump 50. Movement of the dancer roll 38, under the influence of spring 48, in the direction away from guide rolls 36, 46 in response to any decrease below normal in the tension in the tubing passing about the dancer roll, results, through linkage 56, in alteration of the delivery from pump 50 to decrease the delivery of hydraulic fluid to motor 35, tending to decrease the speed of the draw-off rolls 33, 34 and thereby decrease the rate of travel of tubing from these rolls to the dancer roll, thus increasing the tension in the tubing passing about the dancer roll.

Correspondingly, any increase above normal in the tension in the tubing at the dancer roll results in a proportionate increase in the speed of the draw-off rolls 33, 34, decreasing the tension at the dancer roll. Thus the tension in the tubing leaving the dancer roll is continuously regulated and maintained constant. Any change in tension, originating either in the tubing supplied to the dancer roll 38 from rolls 33, 34 or in the tubing drawn from the dancer roll and into the pleater, is automatically corrected by change in speed of the draw-off rolls 33, 34 and the tension in the tubing passing to the pleater restored to its normal value.

The normal value of the tension in the tubing 24 at the dancer roll 38 can be adjusted to that desired by adjustment of the length of the tension spring 48 at its adjustable connection to the frame 2.

Figure 3:
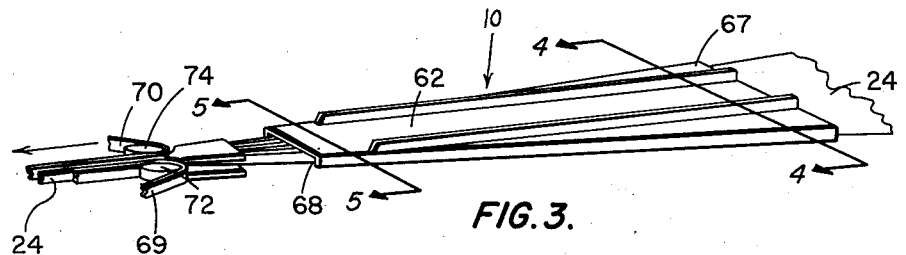
Fig. 3 is a perspective detail view of the mechanism for pleating the tubing.
Figure 4:
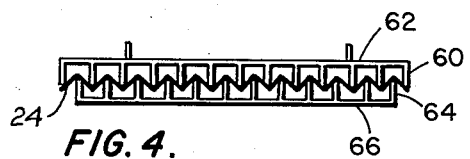
Fig. 4 is a vertical cross sectional view of the pleating mechanism taken on line 4—4 of Fig. 3.
Figure 5:
Fig. 5 is a similar vertical cross section through the pleating mechanism, taken on line 5—5 of Fig. 3.

The tubing passes from the tension control 8 into the pleater at 10. Referring to Figs. 3, 4 and 5, the pleater comprises a series of upper slats 60 depending from an upper plate 62 and a series of lower slats 64 extending upwardly intermediate the upper slats, from a lower plate 66, as is shown particularly in Fig. 4. Each slat extends generally longitudinally of the pleater, in the direction of travel of the tubing 24, and the slats are spaced apart transversely of this direction. The upper slats increase in depth, the lower slats increase in height, and the spacing between the slats decreases, all in the direction of tubing travel. Near the entrance end 67 of the pleater the slats 60 do not substantially overlap the slats 64 in a vertical direction. The exit end 68 of the pleater is narrower than its entrance end 67 and the slats at this exit end are spaced more closely together and overlapped vertically to a greater extent than they are at the entrance end 67, as appears from a comparison of Figs. 4 and 5. The tubing accordingly enters the pleater at 67 and is received between the slats substantially in flat form. The upper slats 60 form upwardly-opening folds in the tubing while the lower slats 64 form another, intermediate series of downwardly-opening folds, adjacent folds having one side in common. Due to the decreasing spacing and the increasing vertical overlap between slats toward the discharge end of the pleater, the folds are progressively deepened and brought together so that the traveling tubing emerges at 68 in pleated condition.

For practical reasons the eye spots 32 are printed on the tubing inwardly from the edge or fold of the flattened tubing. The spindle 20 is tilted at an inclination to the axis of the draw-off rolls 33, 34 to cause the fold in the tubing to be repositioned so that the eye spots 32 are located at the folded edge of the tubing as it enters the pleater 10, appearing partly on one side of the fold and partly on the other. Thus, in the pleated goods every eye spot is visible whether the outermost fold happens to be formed upwardly or formed downwardly in the pleater.

The tubing is taken from the pleater 10 and carried to and through the work station by a pair of endless belts 69, 70 driven by the feed mechanism 14. Referring to Fig. 3, the return flight of belt 69 passes about a guide roller 72 and the return flight of belt 70 passes about a guide roller 74. The guide rollers 72, 74 are positioned closely together so that the tubing leaving the pleater is firmly grasped between the belts and drawn from the pleater with the pleats completely folded together. Thereafter the tubing in the form of a flat pleated strip travels with the belts, being compressed and engaged between them, until the tubing passes into the work station. The belts then leave the tubing to by-pass the work station and re-engage the tubing leaving the work station, as a container, to eject it from the machine.

Figure 6:
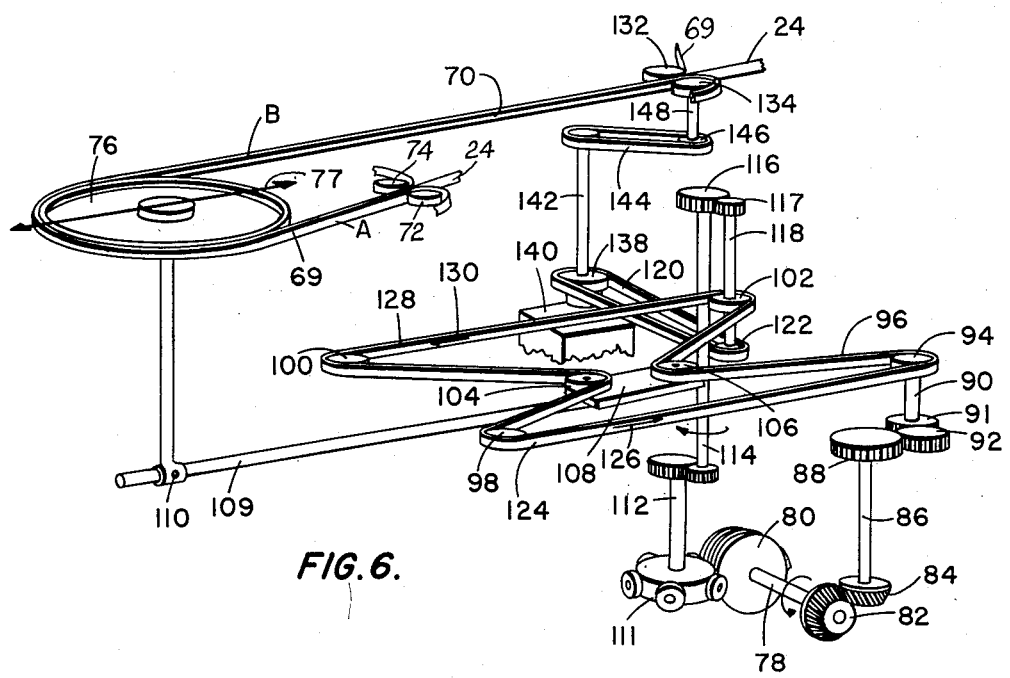
Fig. 6 is a diagrammatic perspective view of the tubing differential whereby the tubing is kept taut as it is taken from the let-off mechanism of Fig. 2 at a uniform rate and is advanced step-by-step to the work station by the tubing feed mechanism.

In their travel from the pleater to the feed mechanism the belts are controlled by the mechanism 18 shown in Fig. 6, which we designate "the tubing differential," so that despite the step-by-step movements of the belts and tubing at the feed mechanism, the tubing is taken from the pleater at a substantially uniform rate of speed and is maintained under substantially uniform tension during its advancing movement to the work station.

Referring particularly to Fig. 6, the endless belts 69 and 70 with the pleated tubing between them lead from the guide rollers 72, 74 to and around a freely rotatable tubing pulley 76, from the opposite side of which they are led off to the feed mechanism 14. To maintain a uniform speed of the belts at the guide rollers 72, 74 at which the tubing is taken away from the pleater, the tubing pulley 76 has imparted to it a bodily reciprocating motion in a direction endwise of the flights of the belts approaching and leaving the pulley, and as shown by the arrow 77 in Fig. 6. This reciprocating motion is timed with the step-by-step feed imparted to the belts at the feed mechanism 14 so that during a dwell of the belts and tubing at the feed mechanism the pulley 76 is translated to the left, as seen in Fig. 6, at the rate which will take up the belts from the guide rollers at average tubing speed, maintaining the belts and tubing taut and under uniform tension. During a feeding movement of the belts at the feed mechanism the pulley 76 is translated to the right, as seen in Fig. 6, to give up the required amount of belt and tubing to the feed mechanism while at the same time continuing to take up belt and tubing leaving the pleater at the average tubing speed.

Both the feed mechanism and the tubing differential 18 are driven from a main shaft 78 which rotates continuously in the direction shown by the arrow and at the rate of one revolution for each container which is formed. The shaft 78 drives the feed mechanism intermittently through a roller gear 80 and drives the tubing differential continuously from a bevel gear 82.

The bevel gear 82 meshes with a bevel gear 84 on shaft 86 which through a change gear 88 drives the pulley 94 through pinions 91 and 92 and the pulley shaft 90. An endless belt indicated generally at 96 passes about pulley 94 and leads about idler pulleys 98 and 100 which are supported in fixed position for free rotation on the machine frame 2. The belt 96 also passes, as shown, about a pulley 102 which is driven intermittently by the roller gear 80. The belt 96 also passes, in the manner shown in Fig. 6, about a pair of pulleys 104, 106 which are carried for free rotation on a yoke 108 so that they are bodily movable together. The yoke 108 is supported on the frame 2 in a suitable guideway for movement along a straight path parallel to the flights of belts 69, 70 leading to and from the tubing pulley 76. That is, the yoke 108, with the pulleys 104, 106 linked by it, is confined to movement parallel to the direction of the arrow 77 in Fig. 6 which also is the direction of motion of the tubing pulley 76. The tubing pulley is supported on frame 2 in a suitable guideway for free movement confined to the direction of arrow 77. The pulley 76 is moved back and forth along its guideway by an operating rod 109 at its one end adjustably connected to the pulley shaft, as by a set screw 110, and at its other end mechanically connected to the yoke 108. Thus the pulley 76 is moved with and by the yoke 108.

The roller gear 80 intermittently rotates its follower 111 which is fixed on shaft 112. The follower through shaft 112 drives shaft 114 which, in turn, through a change gear 116 and pinion 117 drives the pulley 102 an shaft 118.

The drive for the tubing feed mechanism also is taken from shaft 118, a belt 120 driven by pulley 122 on the lower end of shaft 118 driving the feed mechanism through a feed differential later to be described. Thus the drive of the feed mechanism and of the pulley 102 from main shaft 78 is intermittent or step-by-step, and the drive of pulley 94 is continuous and in timed relation thereto.

The operation of the tubing differential just described is as follows:

When the follower 111 of roller gear 80 is at a dwell, and the tubing feed thus likewise at a dwell, the flight B of the belts 69, 70 leaving pulley 76 does not move. The flight A of the belts approaching pulley 76, nevertheless, is moved, continuously to draw the tubing from the pleater 10 at a uniform rate, by translation of the pulley 76 to the leftward as seen in Fig. 6. This translation of pulley 76 to the leftward is brought about as follows: Continuous rotation of shaft 78 rotates the pulley 94; pulley 102 cannot turn as the follower 111 is locked in the gear 80. Thus the flight 124 of the belt 96 continuously travels in the direction of the arrow 126. Flight 128 of belt 96, however, at this time is not moving inasmuch as pulley 102 is stationary. The two pulleys 104, 106 thus bodily move together, and carry the yoke 108 with them, to the left as seen in Fig. 6, at a speed which is one-half the average speed of the tubing. The yoke 108 through operating rod 109 moves the tubing pulley 76 to the left as seen in Fig. 6 at one-half average tubing speed. As this movement lengthens both flights A and B, and since flight B is fixed, flight A is thus moved to the left at twice the speed of translation of pulley 76, drawing the tubing 24 from the pleater 10 at average tubing speed.

When the follower 111 of the roller gear 80 is driven, the pulley 102, stationary in the dwell stage, rotates. The tubing feed also is driven, through belt 120, moving flight B toward the work station and feeding the tubing from this flight into the work station. This feed movement of the tubing must be at a speed which is greater than the average tubing speed, to make up for time lost during the dwell. Rotation of pulley 102 accordingly causes flight 128 of belt 96 to move in the direction of the arrow 130 at a speed more rapid than the speed of the continuously moving flight 124. The greater speed of flight 128 causes the linked pair of pulleys 104, 106 to be moved with their yoke 108 to the right, thus, through operating rod 109, translating the tubing pulley 76 to the right, as seen in Fig. 6, at a rate such as to cause the flight A to continue to be drawn from the pleater at average tubing speed. The flight A passes around the tubing pulley 76, which rotates freely on its axis, to flight B which is moving toward the work station. Thus during both dwell and drive of the roller gear 80, and of the tubing feed, the tubing is drawn from the pleater at substantially uniform speed and the tubing as it advances from the pleater to the work station is maintained taut and kept under constant tension.

Just before entering the work station the tubing is released from the endless belts 69, 70. The belt 69 passes about a pulley 132 and returns about an arrangement of idler pulleys, not shown in detail, to the guide roller 72 at which it again engages the traveling tubing. The other endless belt, 70 leaves the tubing at the same point as it passes about a pulley 134 and is returned about a series of idler pulleys to the pulley 74 for re-engagement with the traveling tubing.

The return flights of belts 69, 70 are passed about idler pulleys which are moved bodily with the pulley 76 to keep the return flights taut. This movable idler pulley for belt 69 appears at 136 and the corresponding pulley for belt 70 appears at 137 in Fig. 1. Some of the idler pulleys for each return flight may be spring-tensioned to move bodily in the direction to further aid in keeping the return flights taut.

The pulley 132 is driven from the pulley 134 and together they drive the endless belts (and feed the tubing) by mechanism now to be described. From the pulley 122, which, as has been described, is driven intermittently by the roller gear 80, the belt 120 drives a first input 138 to a feed differential 140. The output 142 of differential 140 drives the feed pulley 134 through a belt 144, pulley 146 and shaft 148 of pulley 134.

The drive of pulley 134 which would be provided by the first input 138 only, just described, is designed to feed the tubing a fixed, but adjustable, amount always less than the length of the container to be made. To provide the necessary additional length of feed and precisely register the blocks of printing at the work station, a second input to the differential 140 is provided. This second input to differential 140 is operated, from a photo-electric means which scans the tubing during the preceding dwell, to add an increment of feed to the fixed feed provided by the first differential input 138, in accordance with the finding of the photo-electric means as to the length of additional feed required to effect exact registration of a block of printing at the work station.

Referring to Fig. 7, the photocell 150 (Fig. 2) is during a dwell moved from its rest position a fixed distance, say two inches, to the left as seen in Fig. 7, i.e., opposite to the direction of travel of the tubing. This movement of the photocell is effected by a cam 152 on shaft 78, through follower 154, lever 156, pivoted on frame 2 at 157, and links 158, 160. When the photocell has moved the distance, say one inch, required to sense an eye spot the photocell locks a brake, not shown, which prevents further movement of the crank 162 which is pivoted at 157 about the same axis as lever 156. A lug 164 on crank 162 rests on lever 156 whereby the crank rotates with the lever 156 until the crank is locked by the photocell. Motion of crank 162 results in end 166 of link 168 moving downwardly in slot 170 in a cam follower arm 172 which is pivoted at 173, near its upper end, on frame 2. The initial position of end 166 is at the pivot 173 of arm 172. Therefore the distance, or radius, of the final position of end 166 from the pivot of arm 172 is proportional to the distance traveled by the photocell 150 before detecting an eye spot. After photocell travel is completed and just as the roller gear begins to move the tubing, a cam 174 on shaft 78 moves the follower arm 172 through a fixed angle, thus through link 168 moving a rack 176 a distance proportional to the distance traveled by the photocell before detection of an eyespot. The rack 176, through gear 178 and an overrunning clutch, not shown, operates the second input to the feed differential 140. Further rotation of cam 152 returns the photocell 150 to its rest position.

This second input to feed differential 140 gives, in this instance, one inch extra of feed to the tubing to feed the eyespot to the correct location. The rest position of the photocell serves as a datum position, fixed with respect to the work station, from which, during each dwell of a block of printing at the work station, the distance to the next eyespot is measured by movement of the photocell 150. It will be appreciated, therefore, that this second-input arrangement, including the photocell, will accommodate inequalities in eyespot spacing, normally slight, on the printed tubing. Scanning the tubing while it is stationary is highly advantageous and provides precise registry of the blocks of printing on the container at the work station and provides accurate control of the container length.

The machine may be employed with tubing having "eye spots," or equivalent spaced indicia, in which case the photoelectric mechanism described will accurately register the indicia on the completed containers and will precisely control the length of the containers to agree with the "eye spot" spacing. Or, the machine may be employed with unprinted tubing or the like, in which case a dark flag is located adjacent the tubing approaching the station in position to be sensed by the photocell 150 in its movement away from its rest position. The spacing of the flag from the rest position of photocell 150 is adjusted to give the length of feed by the second input to the differential 140 required, when added to the feed provided by the first input 138, to give the length of container desired. The length of feed provided by the first input 138 may be adjusted by changing the change gears 116, 117.

It will be appreciated that when we refer herein to the advance of the tubing from the tension regulating control 8 to the feed mechanism 14 as being at a "uniform" speed and tension we do not mean uniform in the mathematically exact sense, as there may be variations to accommodate any differences in eyespot spacing, but we mean that the advance is continuous and is uniform as contrasted with the distinctly step-by-step movement of the tubing at the feed mechanism.

The method of and mechanism for accurately registering the blocks of printing at the work station is of general utility in the art of feeding material and may be employed with other materials than the tubing hereof, and for registering spaced markings of other kinds than the described eyespots or block of printing.

At the work station 16 the pleated tubing is tightly twisted before the clip seal is applied. For this purpose the tubing is tightly gripped at two spaced points which may be about 1¼ inches apart, by two similar gripping and twisting mechanisms indicated generally at 180, and simultaneously rotated by them, one turning in one direction and the other in the opposite direction.

Figure 9:
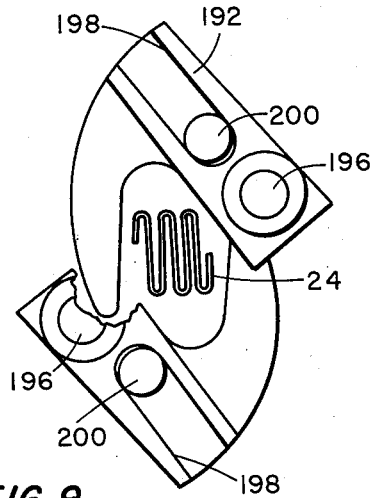
Fig. 9 is a detail view of a part of the mechanism of Fig. 8 illustrating the operation of the twisting mechanism.
Figure 10:
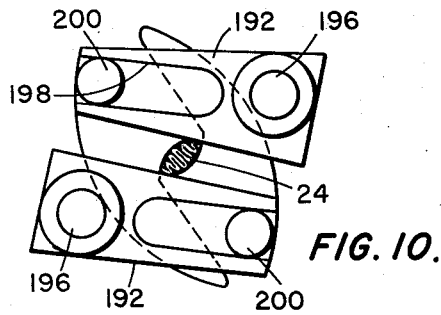
Fig. 10 is a view similar to Fig. 9, but showing a later stage of the twisting operation.

Referring to Fig. 8, which is an exploded view, in each gripping and twisting mechanism, a rack 182 is urged downwardly against a fixed stop 184 by a spring 185. The rack 182 meshes with a gear 186 free on a fixed shaft 188, and a gear 190 which carries two gripping jaws 192. A second rack 194, free to move vertically, meshes with both gears on their sides opposite the rack 182, and thus with rack 182 completely locates the jawed gear 190. Each jaw 192 is pivoted at one end on a stub shaft 196 fixed on gear 190 and each has a slot 198 at its other end, Figs. 9 and 10. Each jaw is moved toward the other to grip the tubing by being rotated on its shaft 196 by a pin 200, two of which, one for each jaw, project from the face of a gear 202, located opposite the gear 190 in a similar set of gears and racks wherein gear 204 corresponds to gear 186 and rack 206 to rack 182. Rack 208 is adapted to be pulled downwardly by an operator 210 to operate the mechanism. Downward motion of rack 208 moves the pins 200 and with them the jaws from the positions shown in Fig. 9 to the positions shown in Fig. 10 in which the tubing 24 is tightly gripped. The tightness of the grip is determined by the force of the spring 185, as yielding of this spring to permit upward movement of rack 182 permits the gear 190 and jaws 192 to rotate bodily with the pins 200, preventing further closing motion of the jaws. Such rotation twists the tubing, as desired.

The set of racks and gears indicated generally at 212 constitutes the other twisting mechanism 180, positioned on the other side of the clip-applying device 214, which similarly rotates the tubing, but in the opposite direction, to create a tight twist in position to receive a clip.

The clip-applying device 214 may be a standard commercial device, such as that shown in Patent No. 2,733,442, adapted to place and tighten a clip such, for example, as that shown in Patent No. 2,700,805, and therefore need not be described in detail. Clips 216 are supplied to the clip-applying device 214 from a hopper 218, Fig. 1, over a track 220. The clip applying device 214 is operated, through rod 222, by any suitable means, from the main shaft 78, in proper timed relation with the feeding movements of the tubing, to apply a clip during a dwell of the tubing.

Applying the clip to a portion of the tubing which has been regularly pleated and neatly and tightly twisted we have found results in a pleasing symmetrical clip-sealed end; the regularity of the gathering of the tubing under the clip results in much greater uniformity of sealing action and in much more reliable seals, with the consequence that the cost of inspection and the loss resulting from rejection of containers are greatly reduced.

Figure 11:
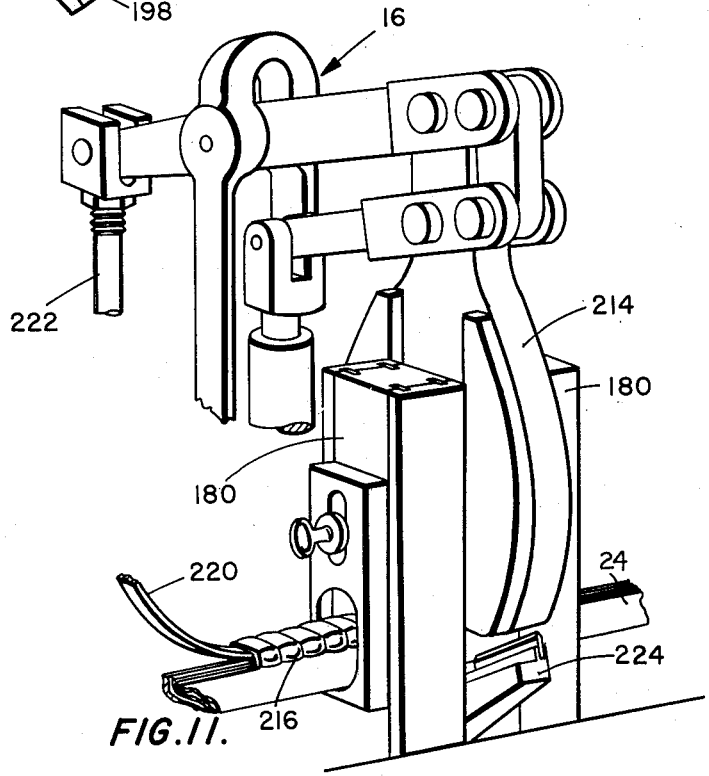
Fig. 11 is a perspective view of the mechanism at the work station at which the tubing is twisted, sealed and cut off.

When the clip has been applied, the twisting mechanisms are operated in the direction opposite that described to untwist the tubing. The tubing is then immediately severed close to the clip on its leading side, without wastage of tubing, by a flying knife 224, Fig. 11, also operated, in proper timed relation, from shaft 78.

Untwisting the tubing before cutting it off results in a cut edge which is a smooth curve and not subject to tearing as is a ragged edge such as has been heretofore produced.

The severed length of tubing, sealed at one end and open at the other, is gripped between portions of the return flights of the belts 69, 70 and upon the next feeding movement is ejected from the machine as a fresh length of tubing is fed into the work station for the formation of the next container.

Certain subject matter of this application relating to the registration of strip fed material which the Patent Office has held to be divisible is claimed in our copending application Serial No. 99,000 filed February 9, 1961 entitled Container Forming Method and Apparatus.

We claim:

1. The method of making, from flexible tubing, containers open at one end and sealed at the other end which comprises continuously advancing tubing from a supply at a uniform rate, feeding the so-advancing tubing to a work station step-by-step so that the tubing intermittently dwells at said station, continuously maintaining the tubing taut in its advancing movement to said station, twisting and then sealing one end of said tubing during a dwell at said station and severing from the tubing a length of tubing including said seal.

2. The method of making, from flexible tubing, containers open at one end and sealed at the other end by a clip which comprises pleating the tubing, flattening the pleated tubing, twisting the flattened and pleated tubing, applying a clip over said flattened, pleated and twisted tubing and severing from the tubing a length of tubing including said clip.

3. The method of making, from flexible tubing, containers open at one end and sealed at the other end by a clip which comprises twisting a length of said tubing, applying a clip over a portion of the twisted length of tubing, untwisting a portion of said length of tubing adjacent said clip and severing the tubing through said untwisted portion to separate from the tubing a length of tubing including said clip.

4. The method of making, from flexible tubing, containers open at one end and sealed at the other end, which comprises drawing the tubing from a supply, pleating the tubing, engaging and continuously compressing the pleated tubing while feeding it to a work station so that the pleats are maintained in the tubing, twisting a portion of the pleated tubing, applying a clip over said twisted portion and then severing from the tubing a length of tubing including said seal.

5. The method of making, from flexible tubing, containers open at one end and sealed at the other end by a clip which comprises continuously drawing the tubing from a supply at a uniform rate, pleating the tubing, feeding the pleated tubing to a work station step-by-step so that the tubing intermittently dwells at said station, engaging and continuously compressing the pleated tubing while feeding it so that the pleats are maintained in the tubing, continuously maintaining the tubing under uniform tension in its travel from said supply to said station, twisting the pleated tubing during a dwell at said station, applying a clip over a portion of the twisted length of tubing, untwisting said length of tubing and severing from the tubing a length of tubing including said seal.

6. A machine for making, from flexible tubing, containers open at one end and sealed at the other end, comprising a rotatable supply roll for carrying a supply of flexible and stretchable tubing, means for continuously advancing tubing from said roll at a uniform rate, means for feeding the so-advanced tubing to a work station step-by-step so that the tubing intermittently dwells at said station, means for continuously maintaining the tubing taut in its advancing movement to said station, and means for twisting and then sealing one end of said tubing during a dwell at said station and means for severing from the tubing a length of tubing including said seal.

7. A machine for making, from flexible tubing, containers open at one end and sealed at the other end, comprising means for continuously advancing said tubing at a uniform rate, means for feeding the so-advanced tubing to a work station step-by-step so that the tubing intermittently dwells at said station, means for continuously maintaining the tubing under uniform tension in its advancing movement to said station, means for sealing the end of said tubing during a dwell at said station and means for severing from the tubing a length of tubing including said seal.

8. A machine for making, from flexible tubing, containers open at one end and sealed at the other end by a metal clip, comprising means for continuously advancing said tubing at a uniform rate, means for feeding the so-advancing tubing to a work station step-by-step so that the tubing intermittently dwells at said station, means for continuously maintaining the tubing under uniform tension in its advancing movement to said station, and means for twisting and then applying a metal clip to the end of said tubing during a dwell at said station and means for severing from the tubing a length of tubing including said clip.

9. In a machine for making, from flexible tubing, containers open at one end and sealed at the other end by a clip, the combination with apparatus for applying said clips and for severing from the tubing lengths of tubing each including a seal, of means for supplying tubing under uniform tension to said apparatus comprising a rotatable supply roll for carrying a supply of flattened tubing, draw-off rolls for drawing tubing from said supply roll, a brake for retarding the rotation of said supply roll as tubing is drawn therefrom, means responsive to the decrease in diameter of said roll of tubing as tubing is drawn therefrom for correspondingly decreasing the retarding effect of said brake, means for continuously advancing the so-drawn tubing at a uniform speed, means for tensioning the tubing in its travel from said draw-off rolls to said advancing means, and means responsive to variations in said tension to regulate the speed of said draw-off rolls to maintain said tension substantially constant.

10. In a machine for making, from flexible tubing, containers open at one end and sealed at the other end, the combination with apparatus for sealing said tubing and for severing from the tubing lengths of tubing each including a seal, of means for supplying tubing under uniform tension to said apparatus comprising a rotatable supply roll for carrying a supply of flattened tubing, draw-off rolls for drawing tubing from said supply roll, means for continuously advancing the so-drawn tubing at a uniform speed, means for tensioning the tubing in its travel from said draw-off rolls to said advancing means, and means responsive to variations in said tension to regulate the speed of said draw-off rolls to maintain said tension substantially constant.

11. In a machine for making, from flexible tubing, containers open at one end and sealed at the other end, the combination with apparatus for sealing said tubing and for severing from the tubing lengths of tubing each including a seal, of means for supplying tubing under uniform tension to said apparatus comprising draw-off rolls for drawing tubing from a supply, means for continuously advancing the so-drawn tubing at a uniform speed, means for tensioning the tubing in its travel from said draw-off rolls to said advancing means, and means responsive to variations in said tension to regulate the speed of said draw-off rolls to maintain said tension substantially constant.

12. In a machine for making, from flexible tubing having blocks of printing at spaced positions therealong, containers open at one end and sealed at the other end, the combination with apparatus for sealing said tubing and for severing from the tubing lengths of tubing each including a seal, of means for supplying tubing under uniform tension to said apparatus step-by-step so that the tubing intermittently dwells with a block of printing in said apparatus comprising a rotatable supply roll for carrying a supply of flattened tubing, draw-off rolls for drawing tubing from said supply roll, a brake for retarding the rotation of said supply roll as tubing is drawn therefrom, means responsive to the decrease in diameter of said roll of tubing as tubing is drawn therefrom for correspondingly decreasing the retarding effect of said brake, means for continuously advancing the so-drawn tubing at a uniform speed, means for tensioning the tubing in its travel from said draw-off rolls to said advancing means, and means responsive to variations in said tension to regulate the speed of said draw-off rolls to maintain said tension substantially constant.

13. A machine for making, from flexible tubing, containers open at one end and sealed at the other which comprises draw-off rolls for drawing the tubing from a supply, means for feeding the so-drawn material to a work station step-by-step, so that the tubing intermittently dwells at said station, means for continuously furnishing the so-drawn tubing to said feeding means at a uniform rate, means responsive both to the rate of travel of the tubing leaving said rolls and to the rate of travel of the tubing to said furnishing means for regulating the speed of said draw-off rolls, and means at said station for sealing the end of the tubing and for severing from the tubing a length including said seal.

14. A machine for making from flexible tubing containers open at one end and sealed at the other which comprises draw-off rolls for continuously drawing the tubing from a supply, means for feeding the so-drawn material to a work station, means responsive both to the rate of travel of the tubing leaving said rolls and to the rate of travel of the tubing into said feeding means for regulating the speed of said draw-off rolls, and means at the work station for sealing the end of the tubing and for severing from the tubing a length including said seal.

15. A machine for making from flexible tubing containers open at one end and sealed at the other which comprises a rotatable supply roll, draw-off rolls for continuously drawing the tubing from said supply roll, a brake for retarding the rotation of said supply roll, responsive to the decrease in diameter of said roll of tubing as tubing is drawn therefrom to correspondingly decrease the said retarding effect, means for feeding the so-drawn material to said work station, means responsive both to the rate of travel of the tubing leaving said draw-off rolls and to the rate of travel of the tubing into said feeding means for regulating the speed of said draw-off rolls, and means at the work station for sealing the end of the tubing and for severing from the tubing a length including said seal.

16. A machine for making, from flexible tubing having blocks of printing at spaced positions therealong, containers open at one end and sealed at the other end by a clip and each having thereon one of said blocks of printing, comprising a rotatable supply roll for carrying a supply of such flexible tubing, means for feeding the tubing to a work station step-by-step so that the tubing intermittently dwells at said station, let-off means for providing tubing from said supply roll under uniform tension, means for pleating the tubing, means for continuously advancing the pleated tubing toward said feeding means at a uniform speed and while maintaining said tension, means for measuring during each dwell the distance of the next block of printing from a datum position fixed with respect to said work station, means controlled by said last-mentioned means for adding to the next feeding movement of the tubing the increment of feed required to position a block of printing at said station, means for twisting said tubing at said station and applying a sealing clip to the twisted portion during a dwell of the tubing, and means for severing from the tubing a length including said clip and a block of printing.

17. A machine for making, from flexible tubing having blocks of printing at spaced positions therealong, containers open at one end and sealed at the other end by a clip and each having thereon one of said blocks of printing, comprising a rotatable supply roll for carrying a supply of such flexible tubing, means for feeding the tubing to a work station step-by-step so that the tubing intermittently dwells with a block of printing at said station, let-off means for providing tubing from said supply roll under uniform tension, means for pleating the tubing, means for continuously advancing the pleated tubing toward said feeding means at a uniform speed and while maintaining said tension, means for twisting said tubing at said station and applying a sealing clip to the twisted portion during a dwell of the tubing, and means for severing from the tubing a length including said clip and a block of printing.

18. A machine for making, from flexible tubing having blocks of printing at spaced positions therealong, containers open at one end and sealed at the other end by a clip and each having thereon one of said blocks of printing, comprising a rotatable supply roll for carrying a supply of such flexible and stretchable tubing, means for feeding the tubing to a work station step-by-step so that the tubing intermittently dwells at said sation, means for continuously advancing the tubing toward said feeding means at a uniform speed, means for adding to each feeding movement the increment of feed required to position a block of printing at said station, means for applying a sealing clip to the tubing during a dwell of the tubing at said station, and means for severing from the tubing a length including said clip and a block of printing.

19. A machine for making, from flexible tubing having blocks of printing at spaced positions therealong containers open at one end and sealed at the other end and each having thereon one of said blocks of printing, comprising means for feeding the tubing to a work station step-by-step so that the tubing intermittently dwells at said station, means for continuously advancing the tubing toward said feeding means at a uniform speed, means for adding to each feeding movement the increment of feed required to position a block of printing at said station, means for sealing the tubing at said station during a dwell of the tubing, and means for severing from the tubing a length including said seal and a block of printing.

20. A machine for making, from flexible tubing having blocks of printing at spaced positions therealong, containers open at one end and sealed at the other end by a metal clip and each having thereon one of said blocks of printing, comprising a rotatable supply roll for carrying a supply of such flexible and stretchable tubing, means for feeding the tubing to a work station step-by-step, let-off means for providing tubing from said supply roll under uniform tension, means for pleating the tubing, means for continuously advancing the pleated tubing toward said feeding means while maintaining said tension, means for sealing the tubing at said station, and means for severing from the tubing a length including said seal and a block of printing.

References Cited in the file of this patent

UNITED STATES PATENTS

| | | |
|---|---|---|
| 1,712,454 | Spencer | May 7, 1929 |
| 2,082,705 | Logan | June 1, 1937 |
| 2,090,307 | Potdevin | Aug. 17, 1937 |
| 2,252,419 | Slaughter | Aug. 12, 1941 |
| 2,288,350 | Gollwitzer | June 30, 1942 |
| 2,542,652 | Freund | Feb. 20, 1951 |
| 2,697,970 | Tipper | Dec. 28, 1954 |
| 2,742,944 | Tipper | Apr. 24, 1956 |
| 2,812,628 | Russell et al. | Nov. 12, 1957 |